United States Patent
Hayakawa et al.

(10) Patent No.: US 10,046,280 B2
(45) Date of Patent: Aug. 14, 2018

(54) METHOD FOR IMPROVING REJECTION RATE OF REVERSE OSMOSIS MEMBRANE

(71) Applicant: KURITA WATER INDUSTRIES LTD., Nakano-ku, Tokyo (JP)

(72) Inventors: Kunihiro Hayakawa, Tokyo (JP); Takahiro Kawakatsu, Tokyo (JP)

(73) Assignee: KURITA WATER INDUSTRIES LTD., Tokyo (JP)

( * ) Notice: Subject to any disclaimer, the term of this patent is extended or adjusted under 35 U.S.C. 154(b) by 475 days.

(21) Appl. No.: 14/649,790

(22) PCT Filed: Dec. 18, 2013

(86) PCT No.: PCT/JP2013/083850
§ 371 (c)(1),
(2) Date: Jun. 4, 2015

(87) PCT Pub. No.: WO2014/103822
PCT Pub. Date: Jul. 3, 2014

(65) Prior Publication Data
US 2015/0306545 A1    Oct. 29, 2015

(30) Foreign Application Priority Data

Dec. 28, 2012 (JP) ................. 2012-287663

(51) Int. Cl.
*B01D 67/00* (2006.01)
*C09D 129/04* (2006.01)
*C08K 5/20* (2006.01)
*C08K 5/134* (2006.01)
*C08K 5/31* (2006.01)
*C02F 1/44* (2006.01)
(Continued)

(52) U.S. Cl.
CPC .......... *B01D 67/0088* (2013.01); *C02F 1/441* (2013.01); *C08K 5/1345* (2013.01);
(Continued)

(58) Field of Classification Search
CPC ... B01D 61/025; B01D 67/0088; C02F 1/441; C02F 2101/30; C02F 2103/04;
(Continued)

(56) References Cited

U.S. PATENT DOCUMENTS

| 4,765,897 A | 8/1988 | Cadotte et al. |
| 2010/0133172 A1 | 6/2010 | Song et al. |

(Continued)

FOREIGN PATENT DOCUMENTS

| JP | S55-003866 A | 1/1980 |
| JP | H03-278817 A | 12/1991 |

(Continued)

OTHER PUBLICATIONS

English translation Japanese Patent Publication No. 2009-056406 (Mar. 2009).*

(Continued)

*Primary Examiner* — John Kim
(74) *Attorney, Agent, or Firm* — Manabu Kanesaka (57) ABSTRACT

To provide a method for improving a rejection rate of an RO membrane, which further improves the stability of removal performance (rejection rate) and flux stability (sustainability of contamination resistance). In a method for improving a rejection rate of an RO membrane, including a step of allowing an aqueous solution containing a polyphenol to pass through an RO membrane, the method further includes a step of allowing an aqueous solution containing at least one type selected from the group consisting of a modified poly(vinyl alcohol), a high molecular polysaccharide, and a poly(amino acid) to pass through the RO membrane. The method preferably further includes a step of allowing an aqueous solution containing an organic compound having an amino group and having a molecular weight of 1,000 or less to pass through the RO membrane.

13 Claims, 1 Drawing Sheet

(51) Int. Cl.
    *B01D 61/02*    (2006.01)
    *C02F 103/08*   (2006.01)
    *C02F 101/30*   (2006.01)
    *C02F 103/04*   (2006.01)
    *C02F 103/34*   (2006.01)

(52) U.S. Cl.
    CPC .................. *C08K 5/20* (2013.01); *C08K 5/31* (2013.01); *C09D 129/04* (2013.01); *B01D 61/025* (2013.01); *C02F 2101/30* (2013.01); *C02F 2103/04* (2013.01); *C02F 2103/08* (2013.01); *C02F 2103/346* (2013.01); *C02F 2209/001* (2013.01); *C02F 2209/20* (2013.01)

(58) Field of Classification Search
    CPC ............ C02F 2103/08; C02F 2103/346; C02F 2209/001; C02F 2209/20; C08K 5/1345; C08K 5/20; C08K 5/31; C09D 129/04
    See application file for complete search history.

(56) References Cited

U.S. PATENT DOCUMENTS

| | | | |
|---|---|---|---|
| 2010/0136238 A1 | 6/2010 | Hayakawa et al. | |
| 2012/0080058 A1 | 4/2012 | Isaias et al. | |
| 2012/0168370 A1 | 7/2012 | Aoki et al. | |
| 2013/0324678 A1* | 12/2013 | Kawakatsu | B01D 65/02 525/432 |

FOREIGN PATENT DOCUMENTS

| | | |
|---|---|---|
| JP | H05-253454 A | 10/1993 |
| JP | H07-185280 A | 7/1995 |
| JP | H07-308671 A | 11/1995 |
| JP | 2001-149759 A | 6/2001 |
| JP | 2005-329334 A | 12/2005 |
| JP | 2006-110520 A | 4/2006 |
| JP | 2007-289922 A | 11/2007 |
| JP | 2009-056406 A | 3/2009 |
| JP | 2012-187468 A | 10/2012 |
| JP | 2012-187469 A | 10/2012 |
| JP | 2012-250192 A | 12/2012 |

OTHER PUBLICATIONS

Japan Patent Office, "Office Action for Japanese Patent Application No. 2012-287663," dated Dec. 27, 2016.
PCT, "International Search Report for International Application No. PCT/JP2013/083850", (dated Mar. 2014).
PCT, International Search Report for International Application No. PCT/JP2013/083850, (dated Mar. 2014).
Non Patent Literature 1: Fujiwara et al., Desalination, vol. 96 (1994), 431 to 439.
Non Patent Literature 2: Satoh and Tamura, Kagaku Kogaku Ronbunshu, vol. 34 (2008), 493 to 498.
Spain Patent Office, "Search Report for ES 201590070/5," dated Dec. 29, 2015.

* cited by examiner

METHOD FOR IMPROVING REJECTION RATE OF REVERSE OSMOSIS MEMBRANE

FIELD OF INVENTION

The present invention relates to a method for improving a rejection rate (salt rejection rate) of a reverse osmosis membrane (RO membrane), and in particular, relates to a method in which a degraded RO membrane is restored to effectively improve the rejection rate thereof. The present invention also relates to an RO membrane treated by a rejection rate improving treatment using this method for improving a rejection rate of an RO membrane and to a rejection rate improving agent to be used for this method.

BACKGROUND OF INVENTION

RO membranes have been used in an ultra pure water manufacturing plant, a drainage recovery plant, a seawater desalination plant, and the like, and by a treatment using an RO membrane, organic substances, inorganic substances, and the like in water can be mostly removed. However, because of influences of oxidizing materials and/or reducing materials present in water, acid/alkali cleaning, aging degradation, and the like, the rejection rate of an RO membrane is gradually decreased, and as a result, required qualities of permeated water (treated water) may not be obtained in some cases. In addition, the removal performance may be degraded in some cases by an unexpected trouble, and the rejection rate itself of an RO membrane as a finished product may not satisfy a required level in some cases.

In a water treatment system, in order to prevent propagation of slime in the system, sodium hypochlorite or the like is added thereto in many cases. Since chlorine is a strong oxidizing agent, when an aqueous solution is supplied to an RO membrane while residual chlorine is not sufficiently removed by reduction, chlorine and the RO membrane are brought into contact with each other, and the RO membrane is degraded thereby.

In order to decompose residual chlorine, although a reducing agent, such as sodium bisulfite, may be added in some cases, under a reducing environment in which sodium bisulfite is excessively added, when a heavy metal, such as Cu, Co, Mn, and/or Fe, is also present therewith, the membrane is degraded (Patent Literature 1, Non Patent Literature 1).

As a method for improving a rejection rate of a permeation membrane, such as an RO membrane, the following methods have been proposed.

(1) A method in which the rejection rate is improved by adhering an anionic or a cationic high molecular compound to a membrane surface (Patent Literature 2).
(2) A method in which the rejection rate of a nano-filtration membrane or an RO membrane is improved by adhering a compound having a poly(alkylene glycol) chain to a membrane surface (Patent Literature 3).
(3) A method in which the salt rejection rate is improved by adhering a tannic acid or the like to a degraded membrane (Non Patent Literature 2).

However, according to the related methods described above, there has been a problem in that since a decrease in permeation flux (flux) is large, even if the rejection rate is restored, the permeation flux is decreased by 20% or more of that obtained before the treatment in some cases or a problem in that a seriously degraded membrane is difficult to be sufficiently restored.

As a method to overcome the above problems of the related techniques, the present applicant has already proposed a method for improving a rejection rate which is characterized in that an aqueous solution containing a first organic compound having a molecular weight of less than 200, a second organic compound having a molecular weight of 200 to less than 500, and a third organic compound having a molecular weight of 500 or more is allowed to pass through an RO membrane (Patent Literature 4).

However, in the method disclosed in Patent Literature 4 for improving a rejection rate using a polyphenol, such as a tannic acid, as the third organic compound having a molecular weight of 500 or more, a problem in that the rejection rate and the flux are gradually decreased by raw water quality occurs; hence, a method which further improves the stability of removal performance (rejection rate) and flux stability (sustainability of contamination resistance) has been desired.

LIST OF LITERATURE

Patent Literature 1: Japanese Patent Publication 7-308671 A
Patent Literature 2: Japanese Patent Publication 2006-110520 A
Patent Literature 3: Japanese Patent Publication 2007-289922 A
Patent Literature 4: Japanese Patent Publication 2012-187469 A

Non Patent Literature

Non Patent Literature 1: Fujiwara et al., Desalination, Vol. 96 (1994), 431 to 439
Non Patent Literature 2: Satoh and Tamura, KAGAKU KOGAKU RONBUNSHU, Vol. 34 (2008), 493 to 498

SUMMARY OF INVENTION

The present invention aims to provide a method for improving a rejection rate of an RO membrane in which the stability of removal performance (rejection rate) and the flux stability (sustainability of contamination resistance) are further improved and a rejection rate improving agent used for the method described above. In addition, the present invention also aims to provide an RO membrane treated by a rejection rate improving treatment using the method for improving a rejection rate of an RO membrane as described above.

Through intensive research performed to achieve the above objects, the present inventors obtained the following finding.

That is, the reason the stability of removal performance by a related rejection rate improving treatment using a polyphenol is inferior is believed that the polyphenol is peeled away from an RO membrane, and in addition, the reason the flux stability is inferior is believed that since the charging property of a membrane surface is enhanced by a rejection rate improving treatment, contaminants are liable to adhere thereto.

The present inventors conceived that when a specific high molecular compound is adsorbed or coated onto a polyphenol which is used for a rejection rate improving treatment, the polyphenol is prevented from being peeled away from the membrane, and the stability of removal performance is improved.

In addition, the present inventors also conceived that when a poly(vinyl alcohol) is used as the high molecular compound described above, the charging property of the membrane surface is decreased to approximately zero, and the flux stability can be obtained. However, there has been a problem in that a common poly(vinyl alcohol) has a low absorption property to the membrane.

Accordingly, since a modified poly(vinyl alcohol) having an ionic group, a poly(alkylene oxide) chain, and/or the like has a high adsorption property to an RO membrane, the present inventors found the use of a modified poly(vinyl alcohol). That is, although a carboxyl group and an amino group are present on the membrane surface of a common RO membrane, those functional groups have a high reactivity with an ionic group, and a poly(alkylene oxide) chain has a high adsorption property to the membrane. Hence, it is believed that when the modified poly(vinyl alcohol) having an ionic group, a poly(alkylene oxide) chain, and/or the like is used, a higher stability than that of a common poly(vinyl alcohol) can be obtained.

Since a high molecular polysaccharide has as its own characteristic, a thickening function to increase the viscosity of an aqueous solution, by this thickening function, the adsorption stability of a polyphenol, which is a rejection rate improving component for an RO membrane, is increased.

It is believed that since a poly(amino acid) has a cationic and an anionic property, by an interaction with a carboxyl group and an amino group present on the surface of an RO membrane, and furthermore by an interaction with a polyphenol, an effect of enhancing the adsorption property is obtained.

The present invention was made based on the finding as described above, and the following is the summary thereof.

[1] A method for improving a rejection rate of a reverse osmosis membrane, the method comprising a step of allowing an aqueous solution containing a polyphenol to pass through a reverse osmosis membrane, wherein the method further comprises a step of allowing an aqueous solution containing at least one type selected from the group consisting of a modified poly(vinyl alcohol), a high molecular polysaccharide, and a poly(amino acid) to pass through the reverse osmosis membrane.

[2] The method for improving a rejection rate of a reverse osmosis membrane according to [1], wherein an aqueous solution containing a polyphenol and at least one type selected from the group consisting of a modified poly(vinyl alcohol), a high molecular polysaccharide, and a poly(amino acid) is allowed to pass through the reverse osmosis membrane.

[3] The method for improving a rejection rate of a reverse osmosis membrane according to [1], wherein after the aqueous solution containing a polyphenol is allowed to pass through the reverse osmosis membrane, the aqueous solution containing at least one type selected from the group consisting of a modified poly(vinyl alcohol), a high molecular polysaccharide, and a poly(amino acid) is allowed to pass through the reverse osmosis membrane.

[4] The method for improving a rejection rate of a reverse osmosis membrane according to [3], wherein the aqueous solution containing at least one type selected from the group consisting of a modified poly(vinyl alcohol), a high molecular polysaccharide, and a poly(amino acid) contains a polyphenol.

[5] The method for improving a rejection rate of a reverse osmosis membrane according to any one of [1] to [4], further comprising a step of allowing an aqueous solution containing an organic compound having an amino group and having a molecular weight of 1,000 or less to pass through the reverse osmosis membrane.

[6] The method for improving a rejection rate of a reverse osmosis membrane according to [5], wherein an aqueous solution containing a polyphenol, at least one type selected from the group consisting of a modified poly(vinyl alcohol), a high molecular polysaccharide, and a poly(amino acid), and an organic compound having an amino group and having a molecular weight of 1,000 or less is allowed to pass through the reverse osmosis membrane.

[7] The method for improving a rejection rate of a reverse osmosis membrane according to [5], wherein after an aqueous solution containing a polyphenol and an organic compound having an amino group and having a molecular weight of 1,000 or less is allowed to pass through the reverse osmosis membrane, the aqueous solution containing at least one type selected from the group consisting of a modified poly(vinyl alcohol), a high molecular polysaccharide, and a poly(amino acid) is allowed to pass through the reverse osmosis membrane.

[8] The method for improving a rejection rate of a reverse osmosis membrane according to [7], wherein the aqueous solution containing at least one type selected from the group consisting of a modified poly(vinyl alcohol), a high molecular polysaccharide, and a poly(amino acid) contains a polyphenol and an organic compound having an amino group and having a molecular weight of 1,000 or less.

[9] The method for improving a rejection rate of a reverse osmosis membrane according to [1], wherein the polyphenol includes a tannic acid.

[10] The method for improving a rejection rate of a reverse osmosis membrane according to [1], wherein the poly (amino acid) includes a polylysine.

[11] The method for improving a rejection rate of a reverse osmosis membrane according to [1], wherein the modified poly(vinyl alcohol) includes at least one type selected from the group consisting of a cationic modified poly (vinyl alcohol) having a cationic group as a modifying group, an anionic modified poly(vinyl alcohol) having an anionic group as a modifying group, and a modified poly(vinyl alcohol) having a poly(alkylene oxide) chain.

[12] The method for improving a rejection rate of a reverse osmosis membrane according to [1], wherein the high molecular polysaccharide includes at least one type selected from the group consisting of a xanthan gum, a guar gum, a carboxymethyl cellulose and its salt, an algin acid and its salt, and a chitosan.

[13] The method for improving a rejection rate of a reverse osmosis membrane according to [1], wherein the total amount of the polyphenol and at least one type selected from the group consisting of the modified poly(vinyl alcohol), the high molecular polysaccharide, and the poly(amino acid) which is supplied to the reverse osmosis membrane and which is calculated from the concentrations in the aqueous solutions and the amounts thereof allowed to pass through the reverse osmosis membrane is set so that the weight ratio of the polyphenol to the at least one type selected from the group consisting of the modified poly(vinyl alcohol), the high molecular polysaccharide, and the poly(amino acid) is in a range of 1:0.1 to 5.

[14] The method for improving a rejection rate of a reverse osmosis membrane according to [5], wherein the organic compound having an amino group and having a molecular weight of 1,000 or less includes arginine and/or aspartame.

[15] The method for improving a rejection rate of a reverse osmosis membrane according to [5], wherein the total amount of the polyphenol and the organic compound having an amino group and having a molecular weight of 1,000 or less which is supplied to the reverse osmosis membrane and which is calculated from the concentrations in the aqueous solutions and the amounts thereof allowed to pass through the reverse osmosis membrane is set so that the weight ratio of the polyphenol to the organic compound having an amino group and having a molecular weight of 1,000 or less is in a range of 1:0 to 2.

[16] The method for improving a rejection rate of a reverse osmosis membrane according to [1], wherein the pressure during the water supply is 0.1 to 0.5 MPa, and the permeation flux is 0.1 to 1.0 $m^3/(m^2 \cdot day)$.

[17] A reverse osmosis membrane treated by the method for improving a rejection rate according to any one of [1] to [16].

[18] A rejection rate improving agent for a reverse osmosis membrane, the agent comprising a polyphenol and at least one type selected from the group consisting of a modified poly(vinyl alcohol), a high molecular polysaccharide, and a poly(amide acid).

[19] The rejection rate improving agent for a reverse osmosis membrane according to [18], further comprising an organic compound having an amino group and having a molecular weight of 1,000 or less.

ADVANTAGEOUS EFFECTS OF INVENTION

According to the present invention, when an RO membrane is treated using a polyphenol and at least one type selected from the group consisting of a modified poly(vinyl alcohol), a high molecular polysaccharide, and a poly(amino acid) (hereinafter, those compounds may be referred to as the "second rejection rate improving component" in some cases), the rejection rate of the RO membrane can be efficiently restored, and an RO membrane in which the stability of removal performance (rejection rate) and the flux stability (sustainability of contamination resistance) are more improved can be obtained.

A more excellent treatment effect can be obtained when an organic compound having an amino group and having a molecular weight of 1,000 or less (hereinafter referred to as the "low molecular weight amino compound" in some cases) is also used together.

Figure 1:
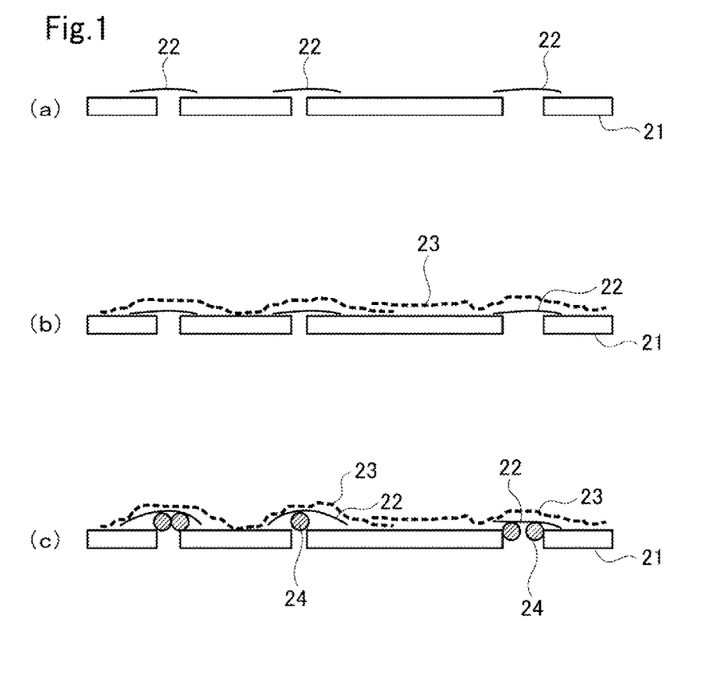
FIG. 1 includes explanatory views illustrating the mechanism of a rejection rate improving treatment by the present invention.

According to the present invention, compared to the case in which a polyphenol 22 is only adsorbed to an RO membrane 21 as shown in FIG. 1(a), when the polyphenol 22 and a second rejection rate improving component 23 are adsorbed to the RO membrane 21 as shown in FIG. 1(b), by the interaction of the second rejection rate improving component 23 with the RO membrane 21 and/or the polyphenol 22, the polyphenol 22 is covered, and in addition, the adsorption condition thereof can be stabilized.

When a low molecular weight amino compound 24 is also used together, as shown in FIG. 1(c), the low molecular weight amino compound 24 restores degraded portions of the RO membrane 21, and hence, the rejection rate can be effectively improved.

DESCRIPTION OF EMBODIMENTS

Hereinafter, embodiments of the present invention will be described in detail.

A method for improving a rejection rate of an RO membrane of the present invention is characterized in that a polyphenol (hereinafter referred to as the "first rejection rate improving component" in some cases) and at least one type selected from the group consisting of a modified poly(vinyl alcohol), a high molecular polysaccharide, and a poly(amino acid), each of which is a second rejection rate improving component, are used together (hereinafter, the first rejection rate improving component and the second rejection rate improving component are each simply called the "rejection rate improving component" in some cases), and furthermore, an organic compound (low molecular weight amino compound) having an amino group and having a molecular weight of 1,000 or less is also preferably used together therewith.

[RO Membrane]

An RO membrane is a liquid separation membrane which enables a solvent to pass therethrough and rejects a solute when a pressure higher than the difference in osmosis pressure between solutions separated by a membrane interposed therebetween is applied to a high concentration side. As the membrane structure of the RO membrane, for example, a high molecular membrane, such as an asymmetric membrane or a composite membrane, may be mentioned. In the present invention, as a material of an RO membrane to be subjected to a rejection rate improving treatment, for example, a polyamide-based material, such as an aromatic polyamide, an aliphatic polyamide, or a composite material therebetween, and a cellulose-based material, such as a cellulose acetate, may be mentioned. Among those mentioned above, although a polyamide-based RO membrane using an aromatic polyamide as a dense layer may be mentioned, a polyamide-based nano filtration membrane may also be mentioned as an object. That is, an RO membrane which is used as a treatment object in the present invention indicates a broad RO membrane including a nano filtration membrane.

In particular, the present invention is preferably applied to an RO membrane which generates a carboxyl group when a C—N bond thereof is cleaved by degradation.

When the salt rejection rate of an RO membrane which is not yet treated by the rejection rate improving treatment is 90% or less, the method of the present invention is preferably applied thereto.

A module mode of the RO membrane is not particularly limited, and for example, a tubular membrane module, a flat membrane module, a spiral membrane module, and a hollow fiber membrane module may be mentioned.

[Polyphenol]

As the polyphenol used in the present invention, a polyphenol having a molecular weight of 500 or more, particularly 500 to 500,000, and more particularly 500 to 50,000 is preferable since effectively covering the surface of an RO membrane and being fixed thereto, and for example, a tannic acid, a lignin, and a lignin derivative may be mentioned. As the tannic acid, a tannic acid, such as Japanese gall, gallnut, quebracho, or mimosa, may be mentioned. Those polyphenols may be used alone, or at least two types thereof may be used in combination.

[Second Rejection Rate Improving Component]

As the second rejection rate improving component, the following modified poly(vinyl alcohol), high molecular polysaccharide, and poly(amino acid) may be used alone, or at least two types thereof may be used in combination.

<Modified Poly(Vinyl Alcohol)>

The modified poly(vinyl alcohol) is formed of vinyl alcohol units and units to which modifying groups are bonded and may further includes vinyl acetate units in some cases.

The molar fraction of the units to which the modifying groups are bonded in the modified poly(vinyl alcohol) is preferably 0.1 to 50 percent by mole, more preferably 0.3 to 40 percent by mole, and particularly preferably 0.5 to 30 percent by mole. When the molar fraction of the units to which the modifying groups are bonded is smaller than this range, an effect of improving the adsorption property to an RO membrane generated by incorporation of the modifying groups cannot be sufficiently obtained, and on the other hand, when the molar fraction is high, the molar fraction of the vinyl alcohol units is relatively decreased, and as a result, the rejection rate improving effect is reduced.

The molar fraction of the vinyl alcohol units in the modified poly(vinyl alcohol) is preferably 50 to 99.9 percent by mole, more preferably 60 to 99.7 percent by mole, and particularly preferably 70 to 99.5 percent by mole. When the molar fraction of the vinyl alcohol units is smaller than this range, since the number of hydroxyl groups in the modified poly(vinyl alcohol) is decreased, a sufficient rejection rate improving effect cannot be obtained. In contrast, when the molar fraction is high, the molar fraction of the units to which the modifying groups are bonded is relatively decreased, and as a result, the effect of improving the adsorption property to an RO membrane generated by incorporation of the modifying groups may not be sufficiently obtained in some cases.

The molar fraction of the vinyl acetate units in the modified poly(vinyl alcohol) is preferably 0 to 20 percent by mole, more preferably 0 to 10 percent by mole, and particularly preferably 0 to 5 percent by mole.

As the index indicating the characteristics of a poly(vinyl alcohol), the degree of saponification has been used. The degree of saponification is obtained by dividing the molar fraction of the vinyl alcohol units by the total molar fraction of the vinyl alcohol units and the vinyl acetate units. The degree of saponification of the modified poly(vinyl alcohol) of the present invention is preferably 80% or more, particularly preferably 85% or more, and more particularly preferably 95% or more. When the degree of saponification is less than 80%, since the number of hydroxyl groups is decreased, the hydrophilic property is degraded, and sufficient rejection rate improving effect and flux stability are liable not to be obtained.

Although the degree of polymerization of the modified poly(vinyl alcohol), that is, the number of the units described above, is not particularly limited, 20 to 20,000 is preferable. When the degree of polymerization is excessively low, the adsorption property to a membrane is degraded, and when the degree of polymerization is excessively high, it is not preferable since the decrease in flux of an RO membrane caused by the rejection rate improving treatment is increased.

As the modifying group of the modified poly(vinyl alcohol), a group containing either an ionic group or a poly (alkylene oxide) group (group having a polyoxyalkylene oxide chain) or a group containing both of them is preferable. As the modified poly(vinyl alcohol), when a compound having a quaternary ammonium salt is selected, the interaction with a carboxyl group and/or a polyphenol on the surface of an RO membrane can be expected. As the modified poly(vinyl alcohol), when a compound having a poly(ethylene oxide) group is selected, since the poly(ethylene oxide) chain is adsorbed to a polyamide-based RO membrane, the interaction with the RO membrane can be expected.

As a cationic poly(vinyl alcohol) having a cationic group as the modifying group, a compound is preferable which is produced in such a way that after a cationic monomer and a vinyl ester, such as vinyl acetate, are copolymerized with each other, hydrolysis (saponification) thereof is performed.

As the cationic monomer, a monomer having $-NH_2$, $-NHR$, $-NRR'$, $-NH_3^+$, $-NH_2R$, $-NHRR'^+$, or $-NRR'R''^-$ is preferable (R, R', and R'' each represent a hydrocarbon residue), and in particular, for example, a diallyl dimethyl ammonium salt, an acrylate or a methacrylate having an ammonium group, a N-substituted methacrylamide, vinylpyridine, a vinylpyridine quaternary ammonium salt, and vinylimidazole may be mentioned.

As commercially available products of the cationic poly (vinyl alcohol), for example, "C-506" and "CM-318" (all manufactured by Kuraray Co., Ltd.), and "GOHSEFIMER K-210" (manufactured by The Nippon Synthetic Chemical Industry Co., Ltd.) may be mentioned.

As an anionic group of an anionic poly(vinyl alcohol) having an anionic group as the modifying group, for example, a carboxyl group, a sulfonic acid group, or a phosphoric acid group may be mentioned, and in view of economical and easy manufacturing points, a carboxyl group and a sulfonic acid group are preferable.

As a method for manufacturing a modified poly(vinyl alcohol) which incorporates a carboxyl group into a poly (vinyl alcohol), a method may be mentioned in which an unsaturated basic acid, an unsaturated dibasic acid, an anhydride thereof, or an ester or a salt of the above acid, which is copolymerizable with a vinyl ester, such as vinyl acetate, and which includes acrylic acid, methacrylic acid, crotonic acid, maleic acid, fumaric acid, itaconic acid, maleic anhydride, or itaconic anhydride, is copolymerized to form a copolymer, and saponification thereof is then performed.

When a copolymer of the above vinyl ester with acrylonitrile, methacrylonitrile, acrylamide, methacrylamide, or the like is saponified, a carboxyl group-modified vinyl alcohol may also be obtained.

As a method using graft polymerization, a method in which saponification is performed after a poly(vinyl alcohol) or a poly(vinyl ester), such as a poly(vinyl acetate), is graft-polymerized with acrylonitrile, acrylamide, or the like may be mentioned. As a method using a chemical reaction of a poly(vinyl alcohol), by a half esterification reaction in which dibasic acid, such as maleic acid, fumaric acid, phthalic acid, malonic acid, succinic acid, oxalic acid, adipic acid, or an anhydride thereof, is allowed to react with a poly(vinyl alcohol), a carboxyl group may be incorporated into a poly(vinyl alcohol).

When a sulfonic acid group is incorporated into a poly (vinyl alcohol), a method in which a poly(vinyl alcohol) is allowed to react with concentrated sulfonic acid may be employed. A sulfonic acid group-modified poly(vinyl alcohol) can be obtained by a method in which after vinyl acetate is copolymerized with ethylene sulfonic acid, allyl sulfonic acid, methallyl sulfonic acid, 2-acrylamide-2-methylpropane sulfonic acid, or an ester or a salt thereof, saponification is then performed.

As a commercially available anionic poly(vinyl alcohol), for example, there may be mentioned "KL-118", "KL-318", "KM-118", "KM-618", and "SK-5102" (all manufactured by Kuraray Co., Ltd.); and "GOHSENAL T-330", "GOHSENAL T-330H", "GOHSENAL T-350", "GOHSERAN L-3266", "GOHSERAN L-0301", "GOHSERAN L-0302", and "GOHSERAN CKS-50" (all manufactured by The Nippon Synthetic Chemical Industry Co., Ltd.).

As a poly(alkylene oxide) chain of a modified poly(vinyl alcohol) having a poly(alkylene oxide) chain, a poly(alkylene oxide) chain in which the number of carbon atoms of the alkylene group is 2 to 4, such as a poly(ethylene oxide), a poly(propylene oxide), or a poly(butylene oxide), is preferable, and a poly(ethylene oxide) is most preferable. The number of repeating units of an alkylene oxide is preferably 2 to 300 and particularly preferably 10 to 100. When the number of repeating units described above is excessively small, the effect of improving an adsorption property to an RO membrane by a poly(alkylene oxide) chain cannot be sufficiently obtained, and when the number described above is excessively large, it is not preferable since the decrease in flux of an RO membrane caused by the rejection rate improving treatment is increased.

A modified poly(vinyl alcohol) having a poly(alkylene oxide) chain as described above can be obtained by a known synthetic method. In addition, a commercially available product, such as "ECOMATI WO-320N" or "ECOMATI WO-320R" manufactured by The Nippon Synthetic Chemical Industry Co., Ltd., may also be used.

As a method for synthesizing a modified poly(vinyl alcohol) having a poly(alkylene oxide) chain, although a method in which after a monomer having a poly(alkylene oxide) chain is copolymerized with vinyl acetate, the vinyl acetate is partially or entirely saponified to form vinyl alcohol is preferable, other synthetic methods may also be used.

As the monomer having a poly(alkylene oxide) chain described above, for example, there may be mentioned a poly(ethylene oxide)monovinyl ether, a poly(propylene oxide)monovinyl ether, a poly(ethylene oxide)monoallyl ether, a poly(ethylene glycol)monomethacrylate, a poly(ethylene glycol)monoacrylate, a poly(propylene glycol)monomethacrylate, a poly(propylene glycol)monoacrylate, a poly(ethylene glycol)-poly(propylene glycol)monomethacrylate, a poly(ethylene glycol)-poly(propylene glycol)monoacrylate, a poly(ethylene glycol-tetramethylene glycol) monomethacrylate, a poly(ethylene glycol-tetramethylene glycol)monoacrylate, a poly(ethylene glycol-propylene glycol)monomethacrylate, or a methoxy poly(ethylene glycol)-poly(propylene glycol)monoacrylate. Those compounds mentioned above may be used alone, or at least two types thereof may be used in combination.

<High Molecular Polysaccharide>

As the high molecular polysaccharide, a high molecular polysaccharide which is particularly used as a food additive, which has a molecular weight of 10,000 or more, and which has a high adsorption property to an RO membrane may be preferably used. The upper limit of the molecular weight of the high molecular polysaccharide is not particularly limited, and any water-soluble high molecular polysaccharide may be used. As the high molecular polysaccharide described above, for example, there may be mentioned a xanthan gum (molecular weight: 2,000,000 or more), a guar gum (molecular weight: 200,000 to 300,000), a carboxymethyl cellulose and its salt (molecular weight: 50,000 or more), algin acid and its salt ((molecular weight: 10,000 or more), and a chitosan (molecular weight: 10,000 or more).

Those high molecular polysaccharides have been used, in general, as a thickening agent and have a preferable adsorption property to an RO membrane. That is, for example, when an aqueous solution containing a xanthan gum at a concentration of 1 mg/L was allowed to pass through an aromatic polyamide-based RO membrane (ES20) manufactured by Nitto Denko Corporation at a pressure of 0.75 MPa, the permeation flux was decreased from 0.9 m$^3$/(m$^2$·day) to 0.5 m$^3$/(m$^2$·day) for 7 days. The reason for this is believed that since the adsorption property of a xanthan gum to the RO membrane is high, the permeation flux thereof is decreased. In addition, in the case of a guar gum, by the same test as described above, the permeation flux was decreased from 0.9 m$^3$/(m$^2$·day) to 0.3 m$^3$/(m$^2$·day) for 7 days. As described above, it is inferred that a compound which decreases the permeation flux of an RO membrane by water supply has a high adsorption property to the RO membrane.

Those high molecular polysaccharides may be used alone, or at least two types thereof may be used in combination.

<Poly(Amino Acid)>

As the poly(amino acid), for example, a polylysine, a polyglycine, and a poly(glutamic acid), each of which is one type of amino acid polymer having a molecular weight of 1,000 to 1,000,000, may be used. In addition, a polymer formed from at least two types of amino acids may also be used. In particular, a polylysine, a polyarginine, a polyhistidine, each of which is a polymer of a basic amino acid, is preferably used. In particular, since having a strong electrostatic interaction with a polyphenol and being able to obtain a significant effect of improving a rejection rate together with a polyphenol, a polylysine is preferable. Those poly(amino acid)s described above may be used alone, or at least two types thereof may be used in combination.

[Low Molecular Weight Amino Compound]

In the present invention, besides the polyphenol and the second rejection rate improving component, the rejection rate improving treatment may also be performed by further using an organic compound (low molecular weight amino compound) having an amino group and having a molecular weight of 1,000 or less, and since the low molecular weight amino compound is also used together, the rejection rate improving effect can be further improved.

As the low molecular weight amino compound, a compound having a molecular weight of 1,000 or less is preferable, and in particular, a compound having a molecular weight of less than 500, such as a compound having a molecular weight of 70 to 300, is preferable in view of an effect of restoring a degraded portion of an RO membrane, and as the low molecular weight amino compound described above, the following may be mentioned by way of example. Although the following low molecular weight amino compounds may be used alone, or at least two types of them may be used in combination, as the number of types is increased, the operation is liable to be complicated.

An aromatic amino compound: a compound having a benzene skeleton and an amino group, such as aniline (molecular weight: 93) or diaminobenzene (molecular weight: 108)

An aromatic amino carboxylic acid compound: a compound having a benzene skeleton, at least two amino groups, and at least one carboxyl group, the number of which is smaller than that of the amino groups, such as 3,5-diaminobenzoic acid, 3,4-diaminobenzoic acid (molecular weight: 152), or 2,4,6-triaminobenzoic acid (molecular weight: 167)

An aliphatic amino acid: a compound having a linear hydrocarbon group with approximately 1 to 20 carbon atoms and at least one amino group, such as methylamine (molecular weight: 31), ethylamine (molecular weight: 45), or octylamine (molecular weight: 129) or a compound having a branched hydrocarbon group with approximately 1 to 20 carbon atoms and at least one amino group, such as aminopentane (molecular weight: 87) or 2-methyl-1,8-octanediamine (molecular weight: 143)

An aliphatic amino alcohol: a compound having a linear or a branched hydrocarbon group with 1 to 20 carbon atoms to which an amino group and a hydroxyl group are bonded, such as 4-amino-2-methyl-1-butanol (molecular weight: 103)

A heterocyclic amino compound: a compound having a heterocyclic ring and an amino group, such as tetrahydrofurfurylamine (molecular weight: 101)

An amino acid compound: a basic amino acid compound, such as arginine (molecular weight: 174) or lysine (molecular weight: 146), an amino acid compound having an amide group, such as asparagine (molecular weight: 132) or glutamine (molecular weight: 146), or an amino compound, such as glycine (molecular weight: 75) or phenylalanine (molecular weight: 165)

An ethylenediamine: a polyethyleneamine, such as ethylenediamine (molecular weight: 60), diethylenetriamine (molecular weight: 103), triethylenetetramine (molecular weight: 146), tetraethylenepentamine (molecular weight: 189) or pentaethylenehexamine (molecular weight: 232)

Aspartame (molecular weight: 294), carnosine (molecular weight: 226), Nα-(L-tyrosyl)-L-arginine (molecular weight: 336), or pyrimidine-2,4,5,6-tetramine (molecular weight: 140)

Each of those low molecular weight amino compounds has a high solubility to water, is allowed to pass through an RO membrane in the form of a stable aqueous solution, is bonded to the RO membrane by a reaction with a carboxyl group thereof, forms an insoluble salt, and is able to block holes generated by degradation of the membrane.

[Concentration of Rejection Rate Improving Component]

In the present invention, as for the concentration in an aqueous solution of the polyphenol, the second rejection rate improving component, and the above-described low molecular weight amino compound, when only one of them is contained, the concentration thereof is preferably set to 1.0 to 5,000 mg/L or particularly 1.0 to 2,000 mg/L, and when at least two types thereof are contained, the total concentration thereof is also preferably set to that as described above. When the concentration described above is excessively low, it is not preferable since a long-period treatment is required. In addition, when this concentration is excessively high, the adsorption occurs so as to form a multilayer structure on the surface of a membrane, and the amount of a compound which does not reach a degraded portion is increased, so that a restoring efficiency is degraded.

In order to effectively obtain the effect of the present invention by using the polyphenol together with the second rejection rate improving component, as the total supply amount to an RO membrane calculated from the concentration in an aqueous solution and the amount thereof which is allowed to pass through the RO membrane, the polyphenol and the second rejection rate improving component are preferably used so that the weight ratio of the polyphenol to the second rejection rate improving component is in a range of 1:0.1 to 5 and, in particular, in a range of 1:0.1 to 2.

When the low molecular weight amino compound is further used, as the total supply amount to an RO membrane calculated from the concentration in an aqueous solution and the amount thereof which is allowed to pass through the RO membrane, the low molecular weight amino compound is preferably used so that the weight ratio of the polyphenol to the low molecular weight amino compound is in a range of 1:0 to 2 and, in particular, in a range of 1:0.1 to 1.

[Treatment Procedure]

Prior to the rejection rate improving treatment by the present invention, a cleaning treatment of an RO membrane is preferably performed. After the RO membrane is cleaned, without performing any additional treatment, the rejection rate improving treatment by the present invention is preferably performed by circulating an aqueous solution containing the rejection rate improving component using a cleaning machine.

In the present invention, when the polyphenol and the second rejection rate improving component are used together with the low molecular weight amino compound, the order of supply of the polyphenol, the second rejection rate improving component, and the low molecular weight amino compound to an RO membrane is not particularly limited, and the rejection rate improving treatment may be performed using one type of aqueous solution prepared by collectively adding those compounds to an aqueous solution, or aqueous solutions of the above compounds may be separately allowed to pass through an RO membrane.

When the treatments are performed separately from each other, the treatment using the second rejection rate improving component is preferably performed at the end. That is, as shown in FIGS. 1(b) and (c), the second rejection rate improving component covers the polyphenol and the low molecular weight amino compound and enhances the adsorption stability thereof. Hence, when the second rejection rate improving component is adsorbed to an RO membrane before the polyphenol and the low molecular weight amino compound are adsorbed thereto, it is not preferable since the adsorption of the polyphenol and the low molecular weight amino compound may be disturbed in some cases.

As a concrete order of supply of the aqueous solutions, the following may be mentioned.

(1) An aqueous solution containing the polyphenol and the second rejection rate improving component is allowed to pass through an RO membrane.

(2) After an aqueous solution containing the polyphenol is allowed to pass through an RO membrane, an aqueous solution containing the second rejection rate improving component is allowed to pass through the RO membrane.

(3) After an aqueous solution containing the polyphenol is allowed to pass through an RO membrane, an aqueous solution containing the polyphenol and the second rejection rate improving component is allowed to pass through the RO membrane.

(4) An aqueous solution containing the polyphenol, the second rejection rate improving component, and the low molecular weight amino compound is allowed to pass through an RO membrane.

(5) After an aqueous solution containing the polyphenol and the low molecular weight amino compound is allowed to pass through an RO membrane, an aqueous solution containing the second rejection rate improving component is allowed to pass through the RO membrane.

(6) After an aqueous solution containing the polyphenol and the low molecular weight amino compound is allowed to pass through an RO membrane, an aqueous solution containing the polyphenol, the low molecular weight amino compound, and the second rejection rate improving component is allowed to pass through the RO membrane.

The rejection rate improving treatment by the present invention may be a treatment in which chemical agents, such as the polyphenol and the second rejection rate improving component, are sequentially added to water to be supplied to or circulated through an RO membrane, and the treatment may be performed in such a way that the water to be supplied to or circulated through an RO membrane is changed for every rejection rate improving component.

When the pressure to allow an aqueous solution containing the rejection rate improving component to pass through an RO membrane is excessively high, adsorption of the rejection rate improving component to a portion of the RO membrane which is not degraded is promoted, and as a result, a problem of decrease in permeation flux may arise, and when the above pressure is excessively low, the contact efficiency of the rejection rate improving component with a degraded portion of the RO membrane is decreased, and as a result, a targeted rejection rate improving effect may not be obtained in some cases. In consideration that the present invention is preferably performed without any additional treatment after an RO membrane is cleaned by a cleaning machine, a water supply pressure (inlet pressure) during the rejection rate improving treatment is preferably 0.1 to 0.5 MPa. Compared to a common operation pressure for the RO membrane, 10% to 150% and in particular, 25% to 100% is preferable. Although the permeation flux during the rejection rate improving treatment relates to the pressure, the water temperature, the membrane shape, and the like, 0.1 to 1.0 $m^3/(m^2 \cdot day)$ is preferable. The reasons for this are that as is the case described above, when the pressure is excessively high, the adsorption to a portion of an RO membrane which is not degraded is disadvantageously promoted, and when the pressure is excessively low, the contact efficiency with a degraded portion of the RO membrane is degraded.

Although the treatment times may not be particularly limited as long as the times are each 1 hour or more, a time of 1 to 48 hours is preferable. When the treatment time is less than 1 hour, it is not preferable since the treatment may be finished before the fixing property of the rejection rate improving component is not sufficiently obtained, and a rejection rate improving component adhered to an RO membrane may be peeled away in some cases.

The temperature (water temperature) during the treatment is preferably 10° C. to 35° C. When the water temperature is excessively low, the permeation water amount is decreased, and the contact efficiency between the rejection rate improving component and an RO membrane is degraded. It is believed that when the water temperature is excessively increased, problems, such as denaturation of the membrane material, may arise in some cases.

As a tracer, an inorganic electrolyte, such as common salt (NaCl), a neutral organic substance, such as isopropyl alcohol or glucose, and a low molecular polymer, such as a poly(maleic acid), may be added to rejection rate improving treatment water which is allowed to pass through an RO membrane for the rejection rate improving treatment, and by this addition, the degree of restoration of the membrane may be confirmed by analysis of the degree of permeation of common salt and/or glucose to water permeated through the RO membrane.

When the rejection rate improving treatment by the present invention is performed in the state in which water to be treated is supplied for a long period of time and/or in the state in which the permeation flux is decreased by membrane contamination, the rejection rate improving treatment by the present invention is preferably performed after chemical agent cleaning is performed, but this cleaning process is not always required.

As a chemical agent for the chemical agent cleaning, in acid cleaning, an inorganic acid, such as a hydrochloric acid, a nitric acid, or a sulfuric acid, or an organic acid, such as citric acid or oxalic acid, may be mentioned. In alkali cleaning, for example, sodium hydroxide or potassium hydroxide may be mentioned. In general, in acid cleaning, pH is set to approximately 2, and in alkali cleaning, pH is set to approximately 12.

RO membranes treated by the method of the present invention are effectively applied to water treatments for recovery and recycle of high or low concentration TOC-containing water which is discharged from an electronic device manufacturing field, a semiconductor manufacturing field, and other various industrial fields or water treatments for ultra pure water manufacturing from industrial water and city water and other fields. Although water to be treated, which is a treatment object, is not particularly limited, the RO membrane is preferably used for organic substance-containing water and is preferably used, for example, for organic substance-containing water at a TOC of 0.01 to 100 mg/L and preferably approximately 0.1 to 30 mg/L. As the organic substance-containing water described above, although drainage from an electronic device manufacturing plant, a transportation machinery manufacturing plant, an organic synthesis plant, a printing and prepress/painting plant, or the like or primary wastewater of the drainage described above may be mentioned, the organic substance-containing water is not limited thereto.

EXAMPLES

Hereinafter, the present invention will be described in more detail with reference to examples and comparative examples.

Figure 2:
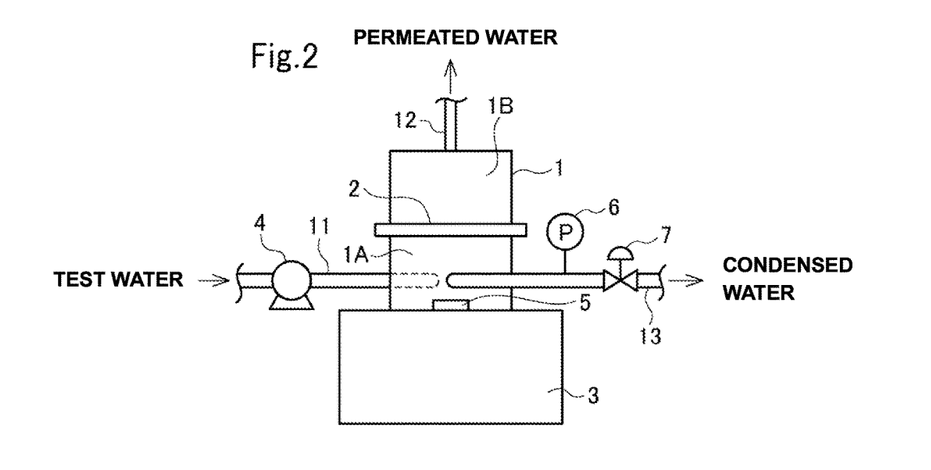
FIG. 2 is a schematic view showing a flat membrane test apparatus used in Examples.

In the following examples and comparative examples, evaluation was carried out in such a way that by the use of a flat membrane test apparatus shown in FIG. 2, after a degraded RO membrane was fitted thereto, rejection rate improving treatment water was supplied, and a NaCl aqueous solution for performance evaluation was then allowed to pass through the membrane.

This flat membrane test apparatus is configured such that a flat membrane cell 2 is provided at an intermediate position of a cylindrical container 1 having a lid in a height direction thereof to separate the inside of the container into a raw water chamber 1A and a permeated water chamber 1B, this container 1 is disposed on a stirrer 3, water to be treated is supplied into the raw water chamber 1A by a pump 4 through a pipe 11, the inside of the raw water chamber 1A is simultaneously stirred by rotating a stirring bar 5 in the container 1, permeated water is simultaneously recovered from the permeated water chamber 1B through a pipe 12, and condensed water is also recovered from the raw water chamber 1A through a pipe 13. To the pipe 13 through which the condensed water is recovered, a pressure gauge 6 and an open-close valve 7 are fitted.

Examples and Comparative Examples Using Modified Poly(Vinyl Alcohol) as Second Rejection Rate Improving Component Example I-1

After an aromatic polyamide-based ultra low pressure RO membrane "ES20" manufactured by Nitto Denko Corporation was degraded with chlorine under the following degradation conditions, a rejection rate improving treatment was performed under the following conditions by the use of arginine (manufactured by Ajinomoto Co., Inc., molecular weight: 174) and aspartame (manufactured by Ajinomoto Co., Inc., molecular weight: 294) as a low molecular weight amino compound; tannic acid AL (manufactured by Fuji Chemical Industry Co., Ltd., molecular weight: 500 or more) as a polyphenol; and a cationic modified poly(vinyl alcohol) "GOHSEFIMER K-210" (manufactured by The Nippon Synthetic Chemical Industry Co., Ltd.) as a modified poly(vinyl alcohol). As for the order of addition of the rejection rate improving components and the water supply time, after an aqueous solution in which the arginine, the aspartame, and the tannic acid AL were mixed together was supplied for 3 hours, GOHSEFIMER K-210 was added to the above aqueous solution, and the treatment was performed for 1 hour.

Before and after this rejection rate improving treatment, the following performance evaluations using a NaCl aqueous solution were performed. In addition, after the rejection rate improving treatment was performed, and the performance evaluation using a NaCl aqueous solution was completed, a liquid prepared as raw water by adding 30 ppm of "IK-110" manufactured by Kurita Water Industries Ltd. as a slime control agent to biologically treated water of a drainage recovery apparatus of Kurita Development Center was supplied under the following conditions, and the rejection rate and the stability of permeation flux after a water supply performed for a predetermined period of time were examined.

<Degradation Conditions>

An aqueous solution of sodium hypochlorite at a concentration 100 ppm (ph: 7.0) was supplied at an inlet pressure of 0.75 MPa and a water temperature 25° C. for 24 hours.

<Conditions of Rejection Rate Improving Treatment>

Each component concentration for rejection rate improvement: 100 mg/L
Inlet pressure: 0.2 MPa
Permeation flux: 0.3 m³/(m²·day)
Water temperature: 25° C.

<Conditions of Performance Evaluation>

NaCl concentration: 500 mg/L
Inlet pressure: 0.75 MPa
Water temperature: 25° C.
pH: 6.5 to 7.0

<Supply Conditions of Biologically Treated Water>

Water temperature: 25° C.
pH: 6.5 to 7.0
Recovery rate: 80%
Water supply time: 200 hours Example I-2

Except that the modified poly(vinyl alcohol) was changed to "ECOMATI WO-320N" (a modified poly(vinyl alcohol) having a poly(alkylene oxide) chain), the rejection rate improving treatment was performed in a manner similar to that of Example I-1, and the performance and the stability were evaluated.

Example I-3

Except that the modified poly(vinyl alcohol) was changed to "GOHSENAL T-330H" (a carboxyl-group modified poly(vinyl alcohol)), the rejection rate improving treatment was performed in a manner similar to that of Example I-1, and the performance and the stability were evaluated.

Example I-4

Except that the modified poly(vinyl alcohol) was changed to "GOHSERAN L-3266" (a sulfonic acid group-modified poly(vinyl alcohol)), the rejection rate improving treatment was performed in a manner similar to that of Example I-1, and the performance and the stability were evaluated.

Examples I-5 to 8

Except that the low molecular weight amino compounds were changed to only the arginine, the rejection rate improving treatments were performed in a manner similar to the respective treatments of Examples I-1 to 4, and the performance and the stability were evaluated.

Example I-9

Except that the low molecular weight amino compounds were not used, the rejection rate improving treatment was performed in a manner similar to that of Example I-1, and the performance and the stability were evaluated.

Example I-10

Except that the modified poly(vinyl alcohol) was changed to "ECOMATI WO-320N", the rejection rate improving treatment was performed in a manner similar to that of Example I-9, and the performance and the stability were evaluated.

Example I-11

Except that as the modified poly(vinyl alcohol), "ECOMATI WO-320N" and "GOHSEFIMER K-210" were used together, the rejection rate improving treatment was performed in a manner similar to that of Example I-9, and the performance and the stability were evaluated.

Examples I-12 to 15

Except that an aqueous solution in which the low molecular weight amino compounds, the polyphenol, and the modified poly(vinyl alcohol) were all mixed together was supplied for 4 hours, the rejection rate improving treatments were performed in a manner similar to the respective treatments of Examples I-1 to 4, and the performance and the stability were evaluated.

Comparative Example I-1

Except that the rejection rate improving treatment was performed using only the polyphenol, and the low molecular weight amino compounds and the modified poly(vinyl alcohol) were not used, the rejection rate improving treatment was performed in a manner similar to that of Example I-1, and the performance and the stability were evaluated.

Comparative Example I-2

Except that the modified poly(vinyl alcohol) was not used, the rejection rate improving treatment was performed in a manner similar to that of Example I-1, and the performance and the stability were evaluated.

Comparative Example I-3

Except that the low molecular weight amino compounds were not used, and a poly(vinyl alcohol) (average polymerization degree: 2,000, degree of saponification: 99%, manufactured by Kishida Chemical Co., Ltd.) was used instead of using the modified poly(vinyl alcohol), the rejection rate improving treatment was performed in a manner similar to that of Example I-1, and the performance and the stability were evaluated.

The results of the above Examples I-1 to 15 and Comparative Examples I-1 to 4 are collectively shown in Tables 1 and 2.

In addition, the permeation flux, the salt rejection rate, and the removal rate were calculated from the following equations.

Permeation flux $[m^3/(m^2 \cdot day)]$=permeated water amount $[m^3/day]$/membrane area $[m^2]$×temperature conversion factor $[-]$ Salt rejection rate [%]=(1-electrical conductivity [mS/m] of permeated liquid/electrical conductivity [mS/m] of condensed liquid)×100

Removal rate [%]=(1-TOC [mg/L] of permeated liquid/TOC [mg/L] of condensed liquid)×100

TABLE 1

| | Rejection rate improving component | | | | Performance evaluations before and after rejection rate improving treatment | | | | Stability of removal rate and permeation flux After supply of biologically treated water for 200 hour | |
|---|---|---|---|---|---|---|---|---|---|---|
| | | | | | Before treatment | | After treatment | | | |
| | Low molecular weight amino compound | Polyphenol | Modified poly (vinyl alcohol) | Others | Salt rejection rate (%) | Permeation flux ($m^3$/ ($m^2 \cdot$ day)) | Salt rejection rate (%) | Permeation flux ($m^3$/ ($m^2 \cdot$ day)) | Removal rate (%) | Permeation flux ($m^3$/ ($m^2 \cdot$ day)) |
| Example I-1 | Arginine, aspartame | Tannic acid AL | GOHSEFIMER K-210 | | 84.6 | 1.32 | 99.1 | 1.15 | 99.1 | 1.10 |
| Example I-2 | Arginine, aspartame | Tannic acid AL | ECOMATI WO-320N | | 86.3 | 1.25 | 98.9 | 1.05 | 98.6 | 1.01 |
| Example I-3 | Arginine, aspartame | Tannic acid AL | GOHSENAL T-330H | | 85.5 | 1.26 | 98.1 | 1.09 | 97.8 | 1.05 |
| Example I-4 | Arginine, aspartame | Tannic acid AL | GOHSERAN L-3266 | | 90.2 | 1.14 | 98.6 | 1.01 | 98.2 | 0.93 |
| Example I-5 | Arginine | Tannic acid AL | GOHSEFIMER K-210 | | 89.9 | 1.20 | 98.1 | 1.04 | 98.0 | 1.05 |
| Example I-6 | Arginine | Tannic acid AL | ECOMATI WO-320N | | 90.4 | 1.37 | 97.8 | 1.12 | 97.6 | 1.08 |
| Example I-7 | Arginine | Tannic acid AL | GOHSENAL T-330H | | 87.6 | 1.19 | 97.4 | 1.06 | 97.0 | 1.04 |
| Example I-8 | Arginine | Tannic acid AL | GOHSERAN L-3266 | | 90.2 | 1.15 | 98.3 | 1.10 | 98.1 | 0.98 |
| Example I-9 | — | Tannic acid AL | GOHSEFIMER K-210 | | 88.9 | 1.31 | 97.2 | 1.18 | 97.2 | 1.20 |
| Example I-10 | — | Tannic acid AL | ECOMATI WO-320N | | 87.4 | 1.34 | 97.5 | 1.11 | 97.4 | 1.10 |
| Example I-11 | — | Tannic acid AL | GOHSEFIMER K-210 ECOMATI WO-320N | | 88.5 | 1.38 | 96.9 | 1.19 | 97.3 | 1.17 |

TABLE 2

| | Rejection rate improving component | | | | Performance evaluations before and after rejection rate improving treatment | | | | Stability of removal rate and flux After supply of biologically treated water for 200 hour | |
|---|---|---|---|---|---|---|---|---|---|---|
| | | | | | Before treatment | | After treatment | | | |
| | Low molecular weight amino compound | Polyphenol | Modified poly (vinyl alcohol) | Others | Salt rejection rate (%) | Permeation flux ($m^3$/ ($m^2 \cdot$ day)) | Salt rejection rate (%) | Permeation flux ($m^3$/ ($m^2 \cdot$ day)) | Removal rate (%) | Permeation flux ($m^3$/ ($m^2 \cdot$ day)) |
| Example I-12 | Arginine, aspartame | Tannic acid AL | GOHSEFIMER K-210 | | 88.0 | 1.28 | 98.4 | 1.16 | 97.5 | 1.15 |
| Example I-13 | Arginine, aspartame | Tannic acid AL | ECOMATI WO-320N | | 82.6 | 1.4 | 97.5 | 1.15 | 97.1 | 1.22 |
| Example I-14 | Arginine, aspartame | Tannic acid AL | GOHSENAL T-330H | | 86.7 | 1.36 | 98.6 | 1.20 | 97.3 | 1.19 |
| Example I-15 | Arginine, aspartame | Tannic acid AL | GOHSERAN L-3266 | | 87.9 | 1.28 | 98.2 | 1.17 | 97.5 | 1.08 |
| Comparative Example I-1 | — | Tannic acid AL | — | | 89.6 | 1.29 | 96.4 | 1.25 | 91.3 | 0.68 |
| Comparative Example I-2 | Arginine, aspartame | Tannic acid AL | — | | 89.1 | 1.11 | 97.9 | 1.04 | 94.8 | 0.72 |

TABLE 2-continued

| | Rejection rate improving component | | | | Performance evaluations before and after rejection rate improving treatment | | | | Stability of removal rate and flux After supply of biologically treated water for 200 hour | |
|---|---|---|---|---|---|---|---|---|---|---|
| | | | | | Before treatment | | After treatment | | | |
| | Low molecular weight amino compound | Polyphenol | Modified poly (vinyl alcohol) | Others | Salt rejection rate (%) | Permeation flux (m$^3$/ (m$^2$ · day)) | Salt rejection rate (%) | Permeation flux (m$^3$/ (m$^2$ · day)) | Removal rate (%) | Permeation flux (m$^3$/ (m$^2$ · day)) |
| Comparative Example I-3 | — | Tannic acid AL | | Poly (vinyl alcohol) | 88.8 | 1.08 | 96.7 | 0.98 | 94.0 | 0.85 |

Examples and Comparative Example Using High Molecular Polysaccharide or Poly(Amino Acid) as Second Rejection Rate Improving Component In the following examples and comparative examples, as a degraded membrane subjected to the rejection rate improving treatment, the following membrane was used.

Degraded membrane: a membrane prepared by accelerated degradation in which an aromatic polyamide-based ultra low pressure RO membrane "ES20" (original membrane) manufactured by Nitto Denko Corporation was immersed in an aqueous solution containing sodium hypochlorite (free chlorine: 100 mg/L) for 24 hours.

For evaluation of the membrane performance after the rejection rate improving treatment, a NaCl aqueous solution (pH: 6.5) at a concentration of 1,000 mg/L was used as an aqueous solution for performance evaluation, this NaCl aqueous solution was supplied at an operation pressure of 0.75 MPa and a temperature of 24° C.±2° C., and the permeation flux and the salt rejection rate after 2 hours and after 200 hours from the start of the water supply were obtained. In addition, the methods for calculating the permeation flux and the salt rejection rate were similar to those described in Example I-1.

As the rejection rate improving treatment water, there were used the following aqueous solutions A to L prepared using arginine (manufactured by Ajinomoto Co., Inc.), aspartame (manufactured by Ajinomoto Co., Inc.), a tannic acid (manufactured by Fuji Chemical Industry Co., Ltd., food additive tannic acid AL, molecular weight: 500 or more), a xanthan gum (manufactured by San-Ei Yakuhin Boeki Co., Ltd., "Bisfect XA", molecular weight: 1,000,000 or more (by LC-OCD, based on dextran using HW65s)), a guar gum (manufactured by San-Ei Yakuhin Boeki Co., Ltd., "Guarcol F50", molecular weight: 1,000,000 or more (by LC-OCD, based on dextran using HW65s)), sodium alginate (manufactured by Kimica Corp., "Kimica Algin I-3", molecular weight: 1,000,000 or more (by LC-OCD, based on dextran using HW65s)), a carboxymethyl cellulose (manufactured by Daicel Fine Chem Ltd., "CMC 1240", molecular weight: approximately 380,000 (presented by the maker)), and a polylysine (manufactured by JNC, molecular weight: approximately 4,500 to 5,000 (presented by the maker)). The water supply pressure of the rejection rate improving treatment water to an RO membrane during the rejection rate improving treatment was set to 0.2 MPa, and the water temperature during the water supply was set to 24° C.±2° C.

Aqueous solution A: aqueous solution containing 50 mg/L of arginine

Aqueous solution B: aqueous solution containing 50 mg/L of arginine and 50 mg/L of aspartame Aqueous solution C: aqueous solution containing 50 mg/L of tannic acid Aqueous solution D: aqueous solution containing 50 mg/L of arginine, 50 mg/L of aspartame, and 50 mg/L of tannic acid Aqueous solution E: aqueous solution containing 50 mg/L of xanthan gum Aqueous solution F: aqueous solution containing 50 mg/L of arginine, 50 mg/L of aspartame, 50 mg/L of tannic acid, and 50 mg/L of xanthan gum Aqueous solution G: aqueous solution containing 50 mg/L of guar gum Aqueous solution H: aqueous solution containing 50 mg/L of sodium alginate Aqueous solution I: aqueous solution containing 50 mg/L of carboxymethyl cellulose Aqueous solution J: aqueous solution containing 50 mg/L of polylysine Aqueous solution K: aqueous solution containing 50 mg/L of arginine, 50 mg/L of aspartame, 50 mg/L of tannic acid, and 50 mg/L of polylysine (to avoid aggregation, pH was adjusted to 3.5 with a hydrochloric acid.)

Aqueous solution L: aqueous solution containing 50 mg/L of tannic acid and 50 mg/L of polylysine (to avoid aggregation, pH was adjusted to 3.5 with a hydrochloric acid.)

Examples II-1 to 11, Comparative Examples II-1 to 7

In Examples II-1 to 3 and II-5 to 10 and Comparative Examples II-6 and 7, after rejection rate improving treatment water I shown in Table 3 was allowed to pass through the degraded membrane for a time shown in Table 3, and rejection rate improving treatment water II shown in Table 3 was then allowed to pass the membrane for a time shown in Table 3, the performance evaluation was carried out.

In Examples II-4, II-11, and Comparative Examples II-2 to 5, after the rejection rate improving treatment water I was allowed to pass through the degraded membrane for a time shown in Table 3, the performance evaluation was carried out.

In Comparative Example II-1, the performance evaluation was carried out without performing the rejection rate improving treatment.

The results thereof are shown in Table 3.

The performance evaluation of the original membrane which was not degraded was also carried out in a manner similar to that described above, and the results thereof were also shown in Table 3.

TABLE 3

| | Rejection rate improving treatment water I | | Rejection rate improving treatment water II | | Two hours after start of water supply | | Two hundreds hours after start of water supply | |
|---|---|---|---|---|---|---|---|---|
| | Type | Water supply time (hr) | Type | Water supply time (hr) | Permeation flux (m³/(m²·day)) | Salt rejection rate (%) | Permeation flux (m³/(m²·day)) | Salt rejection rate (%) |
| Original membrane | — | — | — | — | 0.75 | 98 | 0.74 | 98 |
| Comparative Example II-1 | — | — | — | — | 0.96 | 87 | 0.96 | 87 |
| Comparative Example II-2 | A | 15 | — | — | 0.90 | 93 | 0.93 | 89 |
| Comparative Example II-3 | B | 15 | — | — | 0.89 | 94 | 0.92 | 90 |
| Comparative Example II-4 | C | 15 | — | — | 0.88 | 95 | 0.90 | 91 |
| Comparative Example II-5 | D | 15 | — | — | 0.85 | 98 | 0.88 | 94 |
| Comparative Example II-6 | A | 15 | E | 4 | 0.81 | 93 | 0.81 | 92 |
| Comparative Example II-7 | B | 15 | E | 4 | 0.80 | 94 | 0.81 | 93 |
| Example II-1 | C | 15 | E | 4 | 0.79 | 96 | 0.79 | 95 |
| Example II-2 | D | 15 | E | 4 | 0.75 | 98 | 0.75 | 97 |
| Example II-3 | D | 11 | F | 4 | 0.75 | 98 | 0.75 | 97 |
| Example II-4 | F | 15 | — | — | 0.73 | 97 | 0.73 | 96 |
| Example II-5 | D | 15 | G | 4 | 0.73 | 98 | 0.78 | 97 |
| Example II-6 | D | 15 | H | 4 | 0.78 | 98 | 0.78 | 96 |
| Example II-7 | D | 15 | I | 4 | 0.79 | 98 | 0.76 | 95 |
| Example II-8 | D | 15 | J | 4 | 0.76 | 98 | 0.76 | 98 |
| Example II-9 | D | 11 | K | 4 | 0.76 | 98 | 0.76 | 98 |
| Example II-10 | C | 15 | J | 4 | 0.77 | 96 | 0.77 | 96 |
| Example II-11 | L | 15 | — | — | 0.75 | 96 | 0.75 | 96 |

From the results shown above, it is found that the RO membrane treated by the rejection rate improving treatment of the present invention is excellent in stability of removal performance (rejection rate) and flux stability (sustainability of contamination resistance).

In Examples II-8 to II-11 in which the polylysine was used, the stability of salt rejection rate was particularly excellent. The reason for this is believed that the electrostatic interaction with the tannic acid is strong.

Although the present invention has been described in detail with reference to specific modes, it is apparent to a person skilled in the art that various modification and changed can be performed without departing from the scope of the present invention.

This application claims the benefit of Japanese Patent Application No. 2012-287663, filed Dec. 28, 2012, which is hereby incorporated by reference herein in its entirety.

REFERENCE SIGNS LIST 1 container
1A raw water chamber
1B permeated water chamber
2 flat membrane cell
3 stirrer
21 RO membrane
22 polyphenol
23 second rejection rate improving component
24 low molecular weight amino compound

The invention claimed is:

1. A method for improving a rejection rate of a degraded reverse osmosis membrane, the method comprising:
a step of allowing an aqueous solution containing a polyphenol, and an aqueous solution containing at least one type selected from the group consisting of a modified poly(vinyl alcohol) and a poly(amino acid) to pass through a degraded reverse osmosis membrane,
wherein the modified poly(vinyl alcohol) includes at least one type selected from the group consisting of a cationic modified poly(vinyl alcohol) having a cationic group as a modifying group, an anionic modified poly(vinyl alcohol) having an anionic group as a modifying group, and a modified poly(vinyl alcohol) having a poly(alkylene oxide) chain.

2. The method for improving a rejection rate of a degraded reverse osmosis membrane according to claim 1, wherein after the aqueous solution containing the polyphenol is allowed to pass through the degraded reverse osmosis membrane, the aqueous solution containing the at least one type selected from the group consisting of the modified poly(vinyl alcohol) and the poly(amino acid) is allowed to pass through the degraded reverse osmosis membrane.

3. The method for improving a rejection rate of a degraded reverse osmosis membrane according to claim 2, wherein the aqueous solution containing the at least one type selected from the group consisting of the modified poly(vinyl alcohol) and the poly(amino acid) contains the polyphenol.

4. The method for improving a rejection rate of a degraded reverse osmosis membrane according to claim 1, further comprising a step of allowing an aqueous solution containing an organic compound having an amino group and having a molecular weight of 1,000 or less to pass through the degraded reverse osmosis membrane.

5. The method for improving a rejection rate of a degraded reverse osmosis membrane according to claim 4, wherein an aqueous solution containing the polyphenol, the at least one type selected from the group consisting of the modified poly(vinyl alcohol) and the poly(amino acid), and the organic compound having the amino group and having the molecular weight of 1,000 or less is allowed to pass through the degraded reverse osmosis membrane.

6. The method for improving a rejection rate of a degraded reverse osmosis membrane according to claim 4, wherein after an aqueous solution containing the polyphenol and the organic compound having the amino group and having the molecular weight of 1,000 or less is allowed to pass through the degraded reverse osmosis membrane, the aqueous solution containing the at least one type selected from the group consisting of the modified poly(vinyl alcohol) and the poly(amino acid) is allowed to pass through the degraded reverse osmosis membrane.

7. The method for improving a rejection rate of a degraded reverse osmosis membrane according to claim 6, wherein the aqueous solution containing the at least one type selected from the group consisting of the modified poly(vinyl alcohol) and the poly(amino acid) contains the polyphenol and the organic compound having the amino group and having the molecular weight of 1,000 or less.

8. The method for improving a rejection rate of a degraded reverse osmosis membrane according to claim 4, wherein the organic compound having the amino group and having the molecular weight of 1,000 or less includes arginine and/or aspartame.

9. The method for improving a rejection rate of a degraded reverse osmosis membrane according to claim 4, wherein a total amount of the polyphenol and the organic compound having the amino group and having the molecular weight of 1,000 or less which is supplied to the degraded reverse osmosis membrane and which is calculated from concentrations in the aqueous solutions and amounts thereof allowed to pass through the degraded reverse osmosis membrane is set so that a weight ratio of the polyphenol to the organic compound having the amino group and having the molecular weight of 1,000 or less is in a range of 1:0 to 2.

10. The method for improving a rejection rate of a degraded reverse osmosis membrane according to claim 1, wherein the polyphenol includes a tannic acid.

11. The method for improving a rejection rate of a degraded reverse osmosis membrane according to claim 1, wherein the poly(amino acid) includes a polylysine.

12. The method for improving a rejection rate of a degraded reverse osmosis membrane according to claim 1, wherein a total amount of the polyphenol and the at least one type selected from the group consisting of the modified poly(vinyl alcohol) and the poly(amino acid) which is supplied to the degraded reverse osmosis membrane and which is calculated from concentrations in the aqueous solutions and amounts thereof allowed to pass through the degraded reverse osmosis membrane is set so that a weight ratio of the polyphenol to the at least one type selected from the group consisting of the modified poly(vinyl alcohol) and the poly(amino acid) is in a range of 1:0.1 to 5.

13. The method for improving a rejection rate of a degraded reverse osmosis membrane according to claim 1, wherein a pressure during water supply is 0.1 to 0.5 MPa, and a permeation flux is 0.1 to 1.0 $m^3/(m^2 \cdot day)$.

\* \* \* \* \*